US011470252B2

(12) United States Patent
Reddy

(10) Patent No.: US 11,470,252 B2
(45) Date of Patent: Oct. 11, 2022

(54) METHOD TO INTEGRATE TIME OF FLIGHT PROXIMITY WITH CAMERA BASED ATTENTION SENSING AND SYSTEM THEREFOR

(71) Applicant: DELL PRODUCTS, LP, Round Rock, TX (US)

(72) Inventor: Karun Palicherla Reddy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 17/019,793

(22) Filed: Sep. 14, 2020

(65) Prior Publication Data
US 2022/0086348 A1 Mar. 17, 2022

(51) Int. Cl.
| H04N 5/232 | (2006.01) |
| G01S 13/62 | (2006.01) |
| G06F 1/3231 | (2019.01) |
| G01J 1/42 | (2006.01) |
| G01S 17/58 | (2006.01) |
| G06F 21/32 | (2013.01) |
| G06V 40/19 | (2022.01) |
| G06V 40/18 | (2022.01) |

(52) U.S. Cl.
CPC ........ *H04N 5/23245* (2013.01); *G01J 1/4204* (2013.01); *G01S 13/62* (2013.01); *G01S 17/58* (2013.01); *G06F 1/3231* (2013.01); *G06F 21/32* (2013.01); *G06V 40/19* (2022.01); *G06V 40/193* (2022.01)

(58) Field of Classification Search
CPC .... H04N 5/23245; G01J 1/4204; G01S 13/62; G01S 17/58; G06F 1/3231; G06F 21/32; G06F 2221/2111; G06F 3/013; G06V 40/19; G06V 40/193
See application file for complete search history.

(56) References Cited

U.S. PATENT DOCUMENTS

| 7,376,669 B2 | 5/2008 | Klein |
| 10,198,070 B2* | 2/2019 | Skogö ................... G06F 3/013 |
| 10,212,667 B1 | 2/2019 | Govindassamy et al. |
| 2012/0287035 A1* | 11/2012 | Valko ................... G06F 1/3231 |
| | | 713/323 |
| 2017/0090608 A1* | 3/2017 | Vieta ................ H04M 1/72454 |

* cited by examiner

Primary Examiner — Abhishek Sarma
(74) Attorney, Agent, or Firm — Larson Newman, LLP

(57) ABSTRACT

A method may include enabling operation of a time of flight (TOF) proximity sensor at an information handling system and initializing execution of a software service. The method may further include receiving, at the software service, an alert signal from the TOF proximity sensor indicating movement proximate to the information handling system. In response to receiving the alert signal, a camera at the information handling system may be configured to capture an image. The image may be analyzed by a vision system coupled to the camera to determine a gaze direction of a user at the information handling system. Operation of the information handling system may be configured based on the gaze direction.

20 Claims, 6 Drawing Sheets

(12) United States Patent — US 11,470,252 B2

METHOD TO INTEGRATE TIME OF FLIGHT PROXIMITY WITH CAMERA BASED ATTENTION SENSING AND SYSTEM THEREFOR

FIELD OF THE DISCLOSURE

This disclosure generally relates to information handling systems, and more particularly relates to integrating time of flight proximity with camera based attention sensing.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include enabling operation of a time of flight (TOF) proximity sensor at an information handling system and initializing execution of a software service. The method may further include receiving, at the software service, an alert signal from the TOF proximity sensor indicating movement proximate to the information handling system. In response to receiving the alert signal, a camera at the information handling system may be configured to capture an image. The image may be analyzed by a vision system coupled to the camera to determine a gaze direction of a user at the information handling system. Operation of the information handling system may be configured based on the gaze direction.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
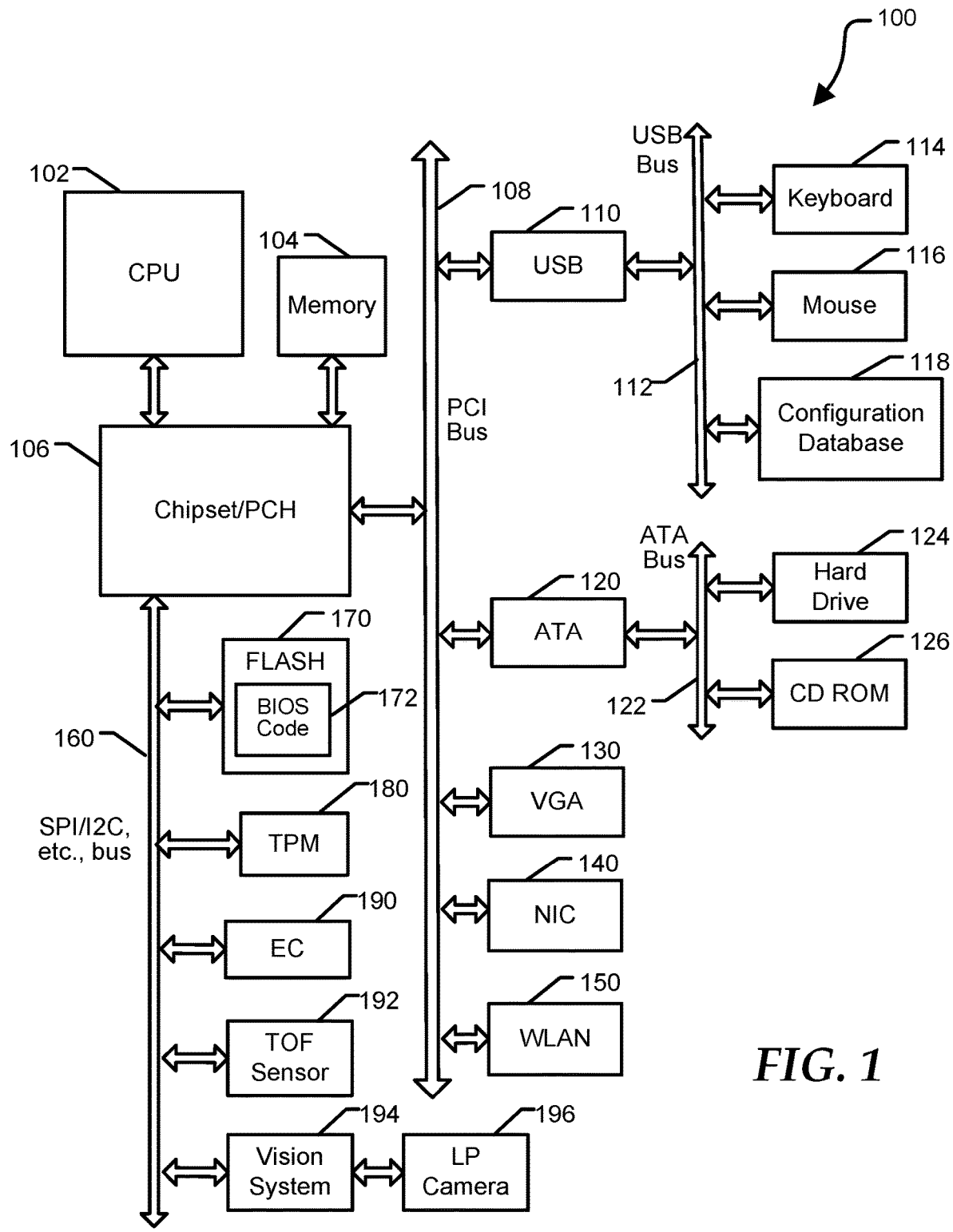
FIG. 1 is a block diagram of an information handling system according to a specific embodiment of the present disclosure.

FIG. 1 illustrates an information handling system 100 including a processor 102, a memory 104, a chipset 106, a PCI bus 108, a universal serial bus (USB) controller 110, a USB 112, a keyboard device 114, a mouse device controller 116, an ATA bus controller 120, an ATA bus 122, a data storage device 124, a compact disk read only memory (CD ROM) device 126, a video graphics array (VGA) device 130, a display device 131, a network interface controller (NIC) 140, a wireless local area network (WLAN) controller 150, one or more serial buses 160, a non-volatile rand access memory (NVRAM) 170 for storing a basic input/output system (BIOS) 172, a trusted platform module (TPM) 180, an embedded controller (EC) 190, a time of flight (TOF) proximity sensor 192, a vision system 194, and a low power (LP) camera 196.

TOF sensor 192 can be used to identify the presence of a user proximate to information handling system 100. A TOF sensor typically includes an incoherent infra-red light source such as a light emitting diode or a coherent light source such as a laser diode to provide illumination, a photoelectric detector, and a timing circuit to calculate the time it takes for light to travel from the light source to an object, and back to the detector. The photoelectric detector can include a single sensor element or an array of elements similar to sensors used in digital cameras. Alternatively, TOF sensor 192 can operate using radio waves, similar to radar systems. TOF sensor 192 can be installed at information handling system 100, for example incorporated at a display device and directed towards the location of a user of system 100. During operation, TOF sensor 192 can identify whether an object, such as a user is positioned in front of information handling system 100.

LP camera 196 typically captures a low resolution image relative to a high definition (HD) camera that may be included at information handling system 100 (HD camera not shown at FIG. 1). For example, LP camera 196 may provide images having 320×240 pixels (QVGA) or fewer pixels. LP camera 196 may be capable of detecting infrared light, and may be coupled to an infrared light source to provide illumination of objects in the vicinity of camera 196. LP cameral 196 typically consumes a small fraction of the power required to operate an HD camera, for example a few mW or lower. Accordingly, LP camera 196 may be referred to as an always-on camera sensor (AoS), capable of operating even when information handling system in a sleep state.

Vision system 194 is configured to analyze an image provided by LP camera 196 to identify a gaze direction of a user operating information handling system 100. Vision system 194 may utilize machine-learning or similar artificial intelligence technology algorithms to interpret and distinguish facial characteristics, such as whether a user's gaze it directed towards LP cameral 196, or instead directed away from the camera and the display. To maintain privacy and security, images captured by LP camera 196 can be provided only to vision system 194, thereby being inaccessible to other processes executing at system 100.

NVRAM 170 can be referred to as a serial peripheral interface (SPI) flash storage device, BIOS SPI, and the like. TPM 180 is configured to ensure that the boot process starts from a trusted combination of hardware and software, and continues until the operating system has fully booted and applications are running. TPM 180 is compliant with an international standard for a secure cryptoprocessor, a dedicated microcontroller designed to secure hardware through integrated cryptographic keys. EC 190 can be referred to as a service processor, a baseboard management controller (BMC), and the like. EC 190 includes a processor that can operate out-of-band with respect to CPU 102. For example, remote management systems can utilize EC 190 to access components at information handling system independent of an operating state of CPU 102. EC 190 may be responsible for performing low level hardware tasks including thermal management and power management operations.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. After the initialization procedure is complete and an operating system, such as Windows, is loaded, computational operation of information handling system can begin. BIOS 172 can be substantially compliant with one or more revisions of the UEFI specification. The UEFI specification provides standard interfaces and interoperability guidelines for devices that together make up an information handling system. The UEFI specification allows for the extension of platform firmware by loading UEFI driver and UEFI application images. For example, an original equipment manufacturer can include customized or proprietary images to provide enhanced control and management of the information handling system 100.

Information handling system 100 can include additional components and additional buses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more buses and/or bus protocols, such as a serial peripheral interface (SPI) bus, an inter-integrated circuit protocol (I2C) bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

Figure 2:
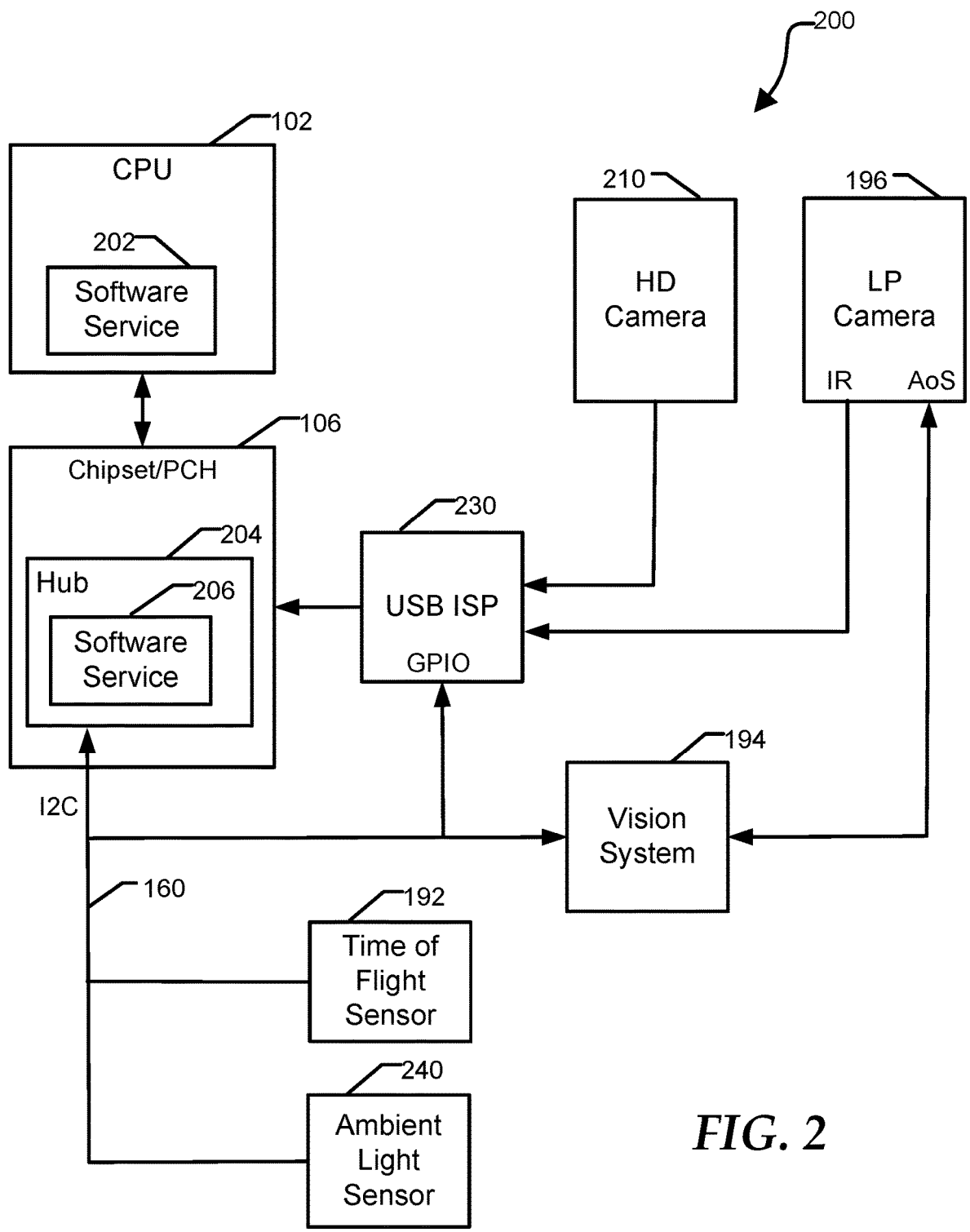
FIG. 2 is a block diagram illustrating a sensor integration system according to a specific embodiment of the present disclosure.

FIG. 2 shows a sensor integration system 200 according to a specific embodiment of the present disclosure. System 200 includes CPU 102, chipset 106, HD camera 210, LP camera 196, a USB image signal processor (ISP) 230, vision system 194, TOF sensor 192, and an ambient light sensor (ALS) 240. CPU 102 is configured to execute a sensor integration software service 202. Chipset 106 includes a sensor hub 204, which includes a microcontroller (not shown at FIG. 2) that is configured to execute a sensor integration software service 206. USB ISP 230 is configured to process images received from HD camera 210, and optionally IR images received from LP camera 196, and provide video to chipset 106 via a USB interface. Vision system 194 is configured to receive an image from LP camera 196, analyze the image, and provide information identifying a user's gaze direction to sensor hub 204 via I2C bus 160. Vision system 194 is also coupled to a GPIO register at USB ISP 230 to identify when vision system 194 is utilizing LP camera 196. TOF sensor 192 and ALS sensor 240 are also coupled to sensor hub 204 via I2C bus 160. Integration software service 202 is configured to execute at CPU 102 during runtime, while information handling system 100 is under the control of an operating system. Sensor integration software service 206 can execute at sensor hub 204 independent of the operating/sleep state of system 100. The operation of services 202 and 206 are described below with reference to FIG. 3-6.

Figure 3:
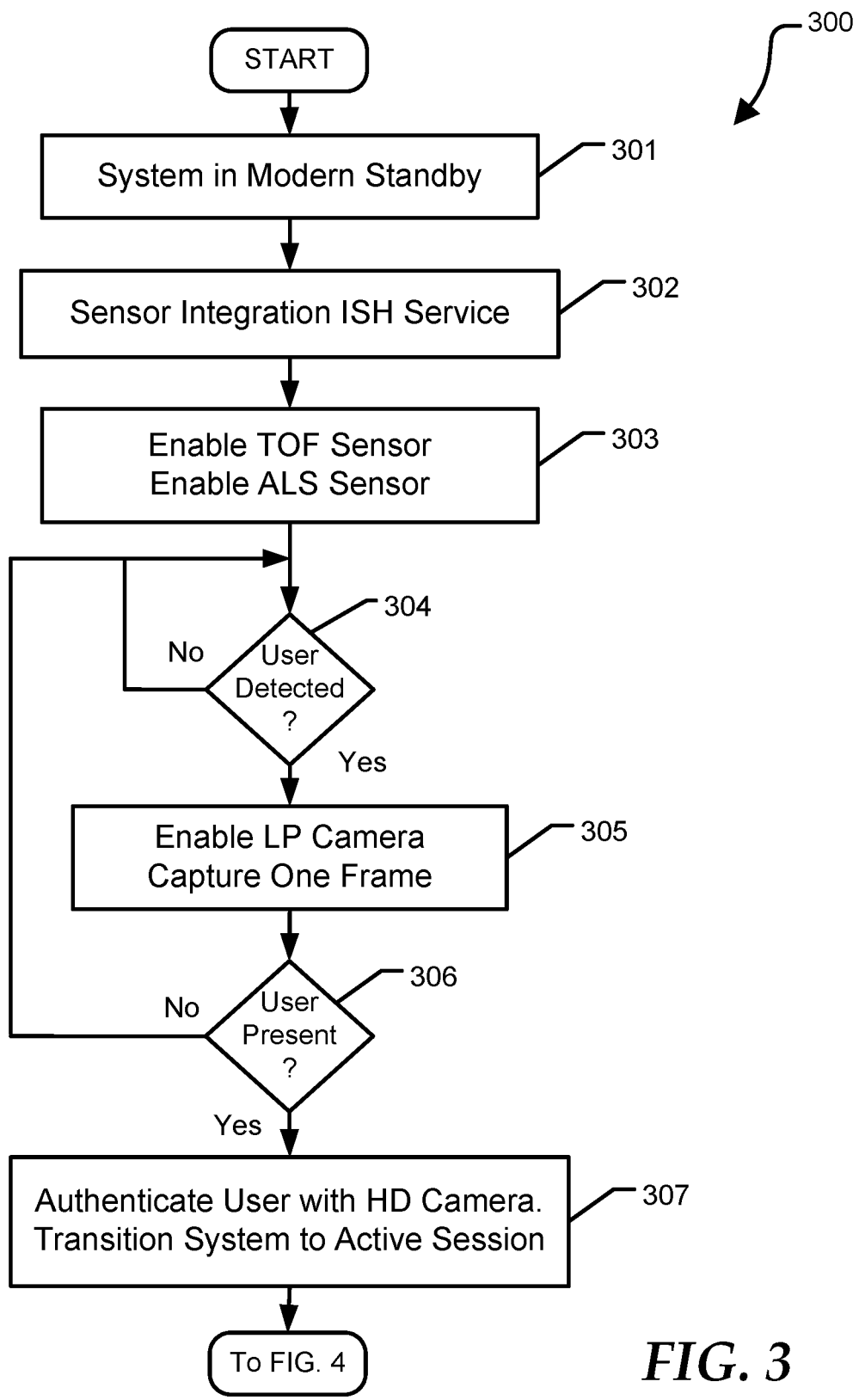
FIG. 3 is a flow diagram illustrating a method for authenticating a user at an information handling system according to a specific embodiment of the present disclosure.

FIG. 3 shows a method 300 for authenticating a user at an information handling system 100 according to a specific embodiment of the present disclosure. Method 300 begins at block 301 where information handling system 100 is in a sleep state, such as a Microsoft Modern Standby mode. Method 300 proceeds to block 302 where sensor integration software service 206 is ready to receive information from TOF sensor 192, ALS 240, and vision system 194. At block 303, TOF sensor 192 and ALS 240 are enabled, if not already operational. At decision block 304, software service 206 is configured to monitor information received from TOF sensor and/or ALS sensor 240 to identify whether a user is present. If a user is not detected, method 300 continues to monitor sensors 192 and 240, however if a user is detected, method 300 proceeds to block 305 where software service 206 configures LP camera 196 to capture an image. The image can be analyzed by vision system 194 to determine whether a user is present at system 100 and, optionally whether their gaze is directed at the display.

If the user is not present, method 300 returns to decision block 304 where TOF sensor 192 and ALS 240 are again monitored to detect a user. If the user is present, method 300 proceeds to block 307 where biometric authentication can be performed to determine whether the user is authorized to operate information handling system 100. For example, software service 206 can initiate Microsoft's Windows Hello platform that can utilize an image provided by HD camera 210 to identify the user. The platform can utilize iris or facial recognition to recognize an authorized user and transition the state of system 100 to an active mode if the identity of the user is verified.

Figure 4:
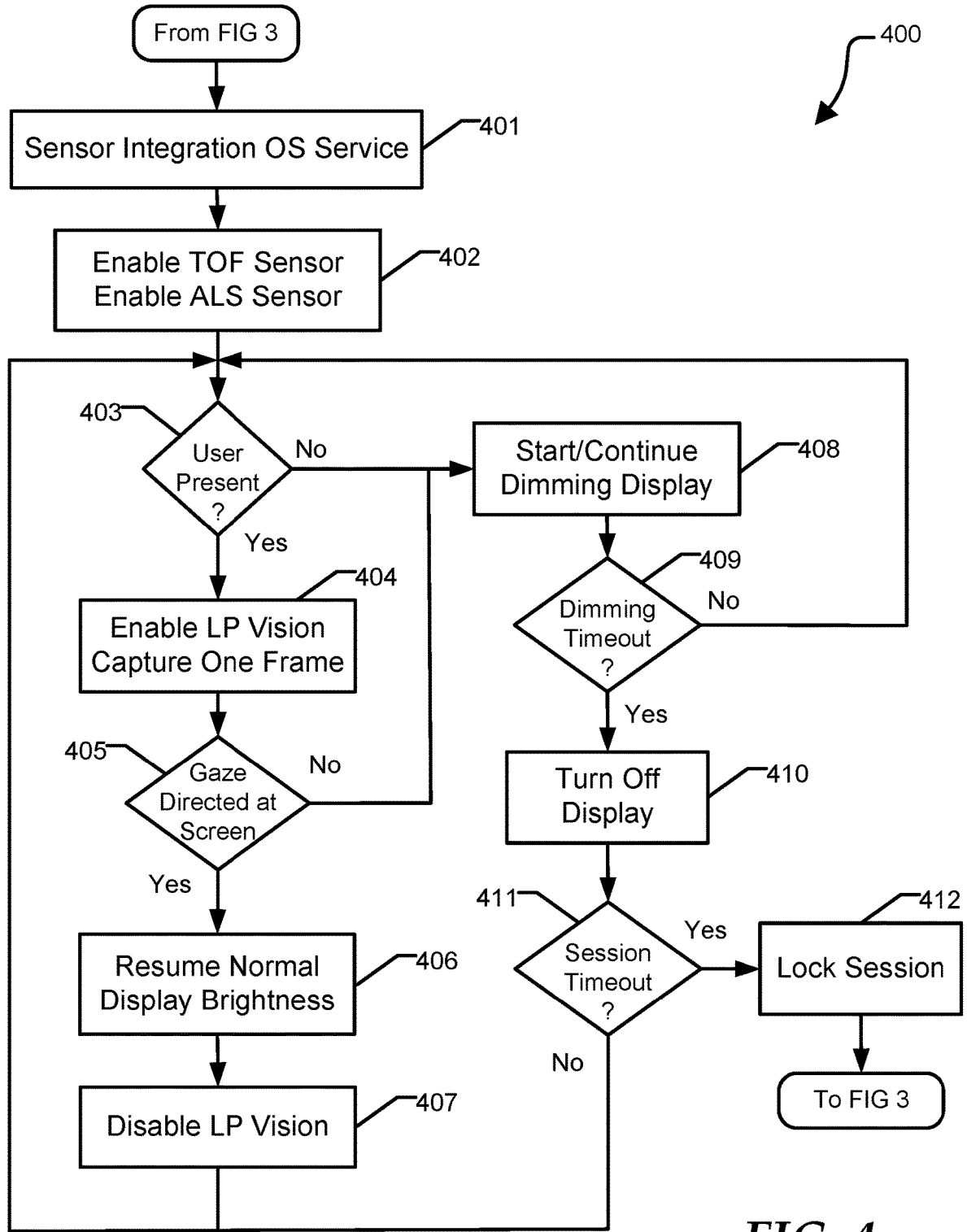
FIG. 4 is a flow diagram illustrating a method for controlling operation of an information handling system according to a specific embodiment of the present disclosure.

FIG. 4 shows a method 400 for controlling operation of an information handling system according to a specific embodiment of the present disclosure. In particular, method 400 shows how information handling system 100 can be configured to return to a sleep state if a user is no longer present or the user is no longer focused on a task at system 100. Method 400 begins at block 401 where sensor integration software service 202 executing at CPU 102 is initialized. Method 400 continues at block 402 where TOF sensor 192 and ALS 240 are enabled, if not already operational. In response to determining, based on sensors 192 and 240, that a user is likely positioned at system 100, method 400 proceeds from decision block 403 to block 404 where LP camera 196 is configured to capture an image. The image can be analyzed by vision system 194 to determine the user's gaze direction. If the user's gaze is directed at LP camera 196, method 400 continue from decision block 405 to block 406 where a brightness of the display is returned to a normal level, if not already so. The method proceeds to block 407 where LP camera 196 and vision system 194 are disabled and the method returns to decision block 403 where TOF sensor 192 and ALS 240 again monitor activity at system 100. The preceding operations can be repeated periodically, for example every 0.1 seconds to repeatedly monitor the gaze direction of the user.

Returning to decision block 403, if TOF sensor 192 and/or ALS 240 do not detect presence of a user, method 400 transitions to block 408 where the brightness of the display is successively dimmed over time. Similarly, if the user's gaze is not directed at the display, method 400 transitions from decision block 405 to block 408 where dimming of the display is initiated. At decision block 409, a timer countdown is initiated and if a predetermined timeout interval has not yet exhausted, the method returns to decision block 403 where TOF sensor 192 and ALS 240 are again evaluated to determine whether the user is present. If the user is not present, or if the user's gaze is not directed at the display, dimming continues until the predetermined interval of time has elapsed, at which point method 400 proceeds from decision block 409 to block 410 where the display is turned off and a session timeout is initiated. If the session timeout has not yet occurred, method 400 can return to decision block 403 where TOF sensor 192 and ALS 240 are again evaluated to determine whether the user is present. If the timeout has expired, method 400 completes at block 412 where the current session is locked and system 100 returns to a sleep state.

Figure 5:
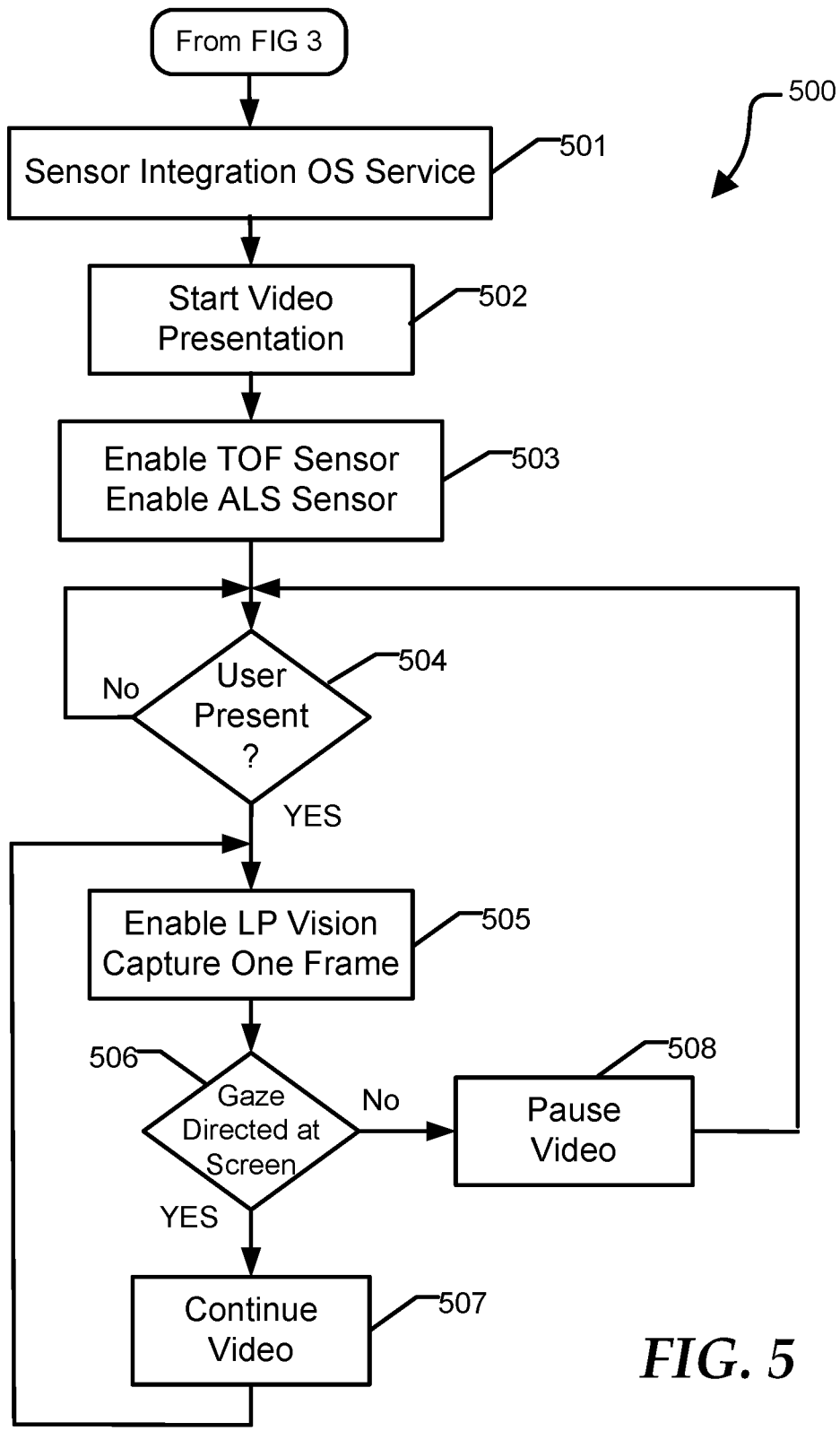
FIG. 5 is a flow diagram illustrating a method for controlling video presentation according to another embodiment of the present disclosure.

FIG. 5 shows a method 500 for controlling video presentation according to another embodiment of the present disclosure. In particular, method 500 shows how a video displayed at information handling system 100 can be paused if a user is no longer present or if the user is no longer focused on a task at system 100. Method 500 begins at block 501 where sensor integration software service 202 executing at CPU 102 is initialized. Method 500 continues at block 502 where presentation of a video at system 100 is initiated. At block 503, TOF sensor 192 and ALS 240 are enabled, if not already operational. In response to determining that a user is likely positioned at system 100, based on sensors 192 and 240, method 400 proceeds from decision block 504 to block 505 where LP camera 196 is configured to capture an image. The image can be analyzed by vision system 194 to determine the user's gaze direction. If the user's gaze is directed at LP camera 196, method 500 continue from decision block 506 to block 507 where presentation of the video continues. If however the user's gaze is not directed at LP camera 196, method 500 transitions from decision block 506 to block 508 where presentation of the video is paused and the method returns to decision block 504 where presence of the user is again determined.

Figure 6:
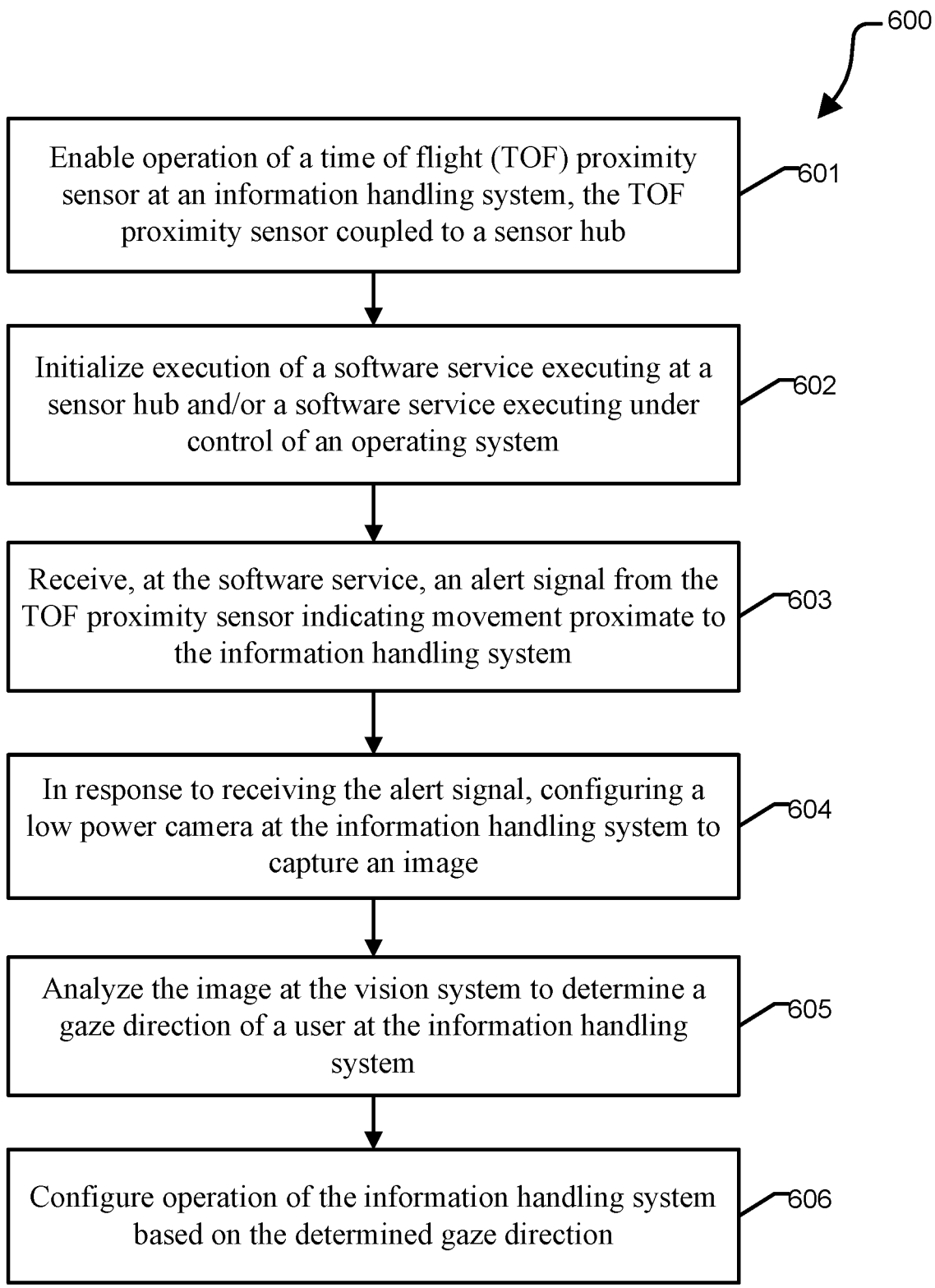
FIG. 6 is a flow diagram illustrating a method for controlling operation of an information handling system according to yet another embodiment of the present disclosure.

FIG. 6 shows a method 600 for controlling operation of an information handling system according to yet another embodiment of the present disclosure. Method 600 begins at block 601 where operation of a TOF proximity sensor is enabled at an information handling system, the TOF proximity sensor coupled to a sensor hub. For example, FIG. 2 shows TOF sensor 192 coupled to sensor hub 204. At block 602, a software service executing at a sensor hub is enabled. Additionally or alternatively, a software service executing under control of an operating system can be initialized. For example, software service 206 can monitor TOF sensor 192 to determine whether a suspected user is present at information handling system 100. Similarly, software service 202 can perform similar duties when system 100 is under control of an operating system. Method 600 continues at block 603 where an alert signal is received from the TOF proximity sensor at the software service, the alert indicating that a probable user is proximate to information handling system 100. At block 604, in response to receiving the alert signal, a low power camera at the information handling system is configured to capture an image. For example, service 206 or service 202 can request LP camera 196 to capture an image. Method 600 continues at block 605 where the image is analyzed by at the vision system to determine a gaze direction of a user at the information handling system. Method 600 completes at block 606 where operations at information handling system 100 can be configured based on the present gaze direction of the user.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a display device;
   a sensor hub;
   a time of flight (TOF) proximity sensor coupled to the sensor hub via a serial interface;
   a first camera coupled to a vision system; and
   a software service executing under control of an operating system, the service to:
      receive an alert signal from the TOF proximity sensor indicating movement proximate to the information handling system;
      in response to receiving the alert signal, configure the first camera to capture a first image;
      analyze the first image at the vision system to determine a gaze direction of a user at the information handling system; and
      configure operation of the information handling system based on the gaze direction.

2. The information handling system of claim 1, wherein the software service is further to initiate transition of the information handling system from an operational state to a sleep state in response to receiving an indication from the vision system that the gaze direction of the user is not directed at the display device.

3. The information handling system of claim 2, wherein the software service is further to:
receive a second alert signal from the TOF proximity sensor indicating movement proximate to the information handling system;
in response to receiving the second alert signal, configure the camera to capture a second image; and
discontinue the transition to the sleep state in response to receiving an indication from the vision system that a gaze direction of the user is directed at the display device.

4. The information handling system of claim 1, wherein the software service is further to pause display of a video at the display device in response to receiving an indication from the vision system that the gaze direction of the user is not directed at the display device.

5. The information handling system of claim 4, wherein the software service is further to:
receive a second alert signal from the TOF proximity sensor indicating movement proximate to the information handling system;
in response to receiving the second alert signal, configure the camera to capture a second image; and
resume display of the video at the display device in response to receiving an indication from the vision system that the gaze direction of the user is directed at the display device.

6. The information handling system of claim 1, further comprising:
an ambient light sensor coupled to the sensor hub,
wherein the software service is further to configure the camera to capture a second image in response to receiving an alert signal from the ambient light sensor indicating movement proximate to the information handling system.

7. The information handling system of claim 1, wherein the camera has a resolution of 320×320 pixels or fewer, and a power consumption of less than 10 mW.

8. A method comprising:
enabling operation of a time of flight (TOF) proximity sensor at an information handling system;
initializing execution of a software service;
receiving, at the software service, an alert signal from the TOF proximity sensor indicating movement proximate to the information handling system;
in response to receiving the alert signal, configuring a camera at the information handling system to capture a first image, the camera coupled to a vision system;
analyzing the first image at the vision system to determine a gaze direction of a user at the information handling system; and
configuring operation of the information handling system based on the gaze direction.

9. The method of claim 8, further comprising initiating transition of the information handling system from an operational state to a sleep state in response to receiving an indication from the vision system that the gaze direction of the user is not directed at a display device of the information handling system.

10. The method of claim 9, further comprising:
receiving a second alert signal from the TOF proximity sensor indicating movement proximate to the information handling system;
in response to receiving the second alert signal, configuring the camera to capture a second image; and
discontinuing the transition to the sleep state in response to receiving an indication from the vision system that the gaze direction of the user is directed at the display device.

11. The method of claim 8, further comprising pausing display of a video at a display device at the information handling system in response to receiving an indication from the vision system that the gaze direction of the user is not directed at the display device.

12. The method of claim 11, further comprising:
receiving a second alert signal from the TOF proximity sensor indicating movement proximate to the information handling system;
in response to receiving the second alert signal, configuring the camera to capture a second image; and
resuming display of the video at the display device in response to receiving an indication from the vision system that the gaze direction of the user is directed at the display device.

13. The method of claim 8, further comprising:
receiving, at the software service, a second alert signal from an ambient light sensor, the second alert signal indicating movement proximate to the information handling system; and
in response to receiving the second alert signal, configuring the camera to capture a second image.

14. An information handling system comprising:
a display device;
a sensor hub including a microcontroller;
a time of flight (TOF) proximity sensor coupled to the sensor hub via a serial interface;
a first camera coupled to a vision system; and
a first software service executing at the microcontroller, the service to:
receive an alert signal from the TOF proximity sensor indicating movement proximate to the information handling system;
in response to receiving the alert signal, configure the first camera to capture a first image;
analyze the first image at the vision system to determine a gaze direction of a user at the information handling system; and
configure operation of the information handling system based on the gaze direction.

15. The information handling system of claim 14, wherein the first software service is further to initiate transition of the information handling system from a sleep state to an operational state in response to receiving an indication from the vision system that the gaze direction of the user is not directed at the display device.

16. The information handling system of claim 14, wherein the first software service is further to:
activate a second camera in response to receiving the notification, the second camera having a resolution and power consumption that is greater than the resolution and power consumption of the first camera;
initiate biometric authentication based on an image provided by the second camera; and
initiate transition of the information handling system from a sleep state to an operational state in response to determining that the user is authorized to operate the information handling system.

17. The information handling system of claim 14, further comprising a second software service executing under control of an operating system, the second software service to:

receive a second alert signal from the TOF proximity sensor indicating movement proximate to the information handling system;

in response to receiving the second alert signal, configure the first camera to capture a second image; and analyze the second image at the vision system to determine the gaze direction of the user; and initiate transition of the information handling system from an operational state to a sleep state in response to receiving an indication from the vision system that the gaze direction of the user is not directed at the display device.

18. The information handling system of claim 17, wherein the software service is further to:

receive a third alert signal from the TOF proximity sensor indicating movement proximate to the information handling system;

in response to receiving the third alert signal, configure the first camera to capture a third image; and discontinue the transition to the sleep state in response to receiving an indication from the vision system that the gaze direction of the user is directed at the display device.

19. The information handling system of claim 14, further comprising a second software service executing under control of an operating system, the second software service to:

receive a second alert signal from the TOF proximity sensor indicating movement proximate to the information handling system;

in response to receiving the second alert signal, configure the first camera to capture a second image;

analyze the second image at the vision system to determine the gaze direction of the user; and pause display of a video at the display device in response to receiving an indication from the vision system that the gaze direction of the user is not directed at the display device.

20. The information handling system of claim 19, wherein the software service is further to:

receive a third alert signal from the TOF proximity sensor indicating movement proximate to the information handling system;

in response to receiving the third alert signal, configure the first camera to capture a third image; and resume display of the video at the display device in response to receiving an indication from the vision system that the gaze direction of the user is directed at the display device.

* * * * *